F. J. ANDERSON.
FLY KILLING APPARATUS.
APPLICATION FILED APR. 17, 1915.
1,155,697. Patented Oct. 5, 1915.
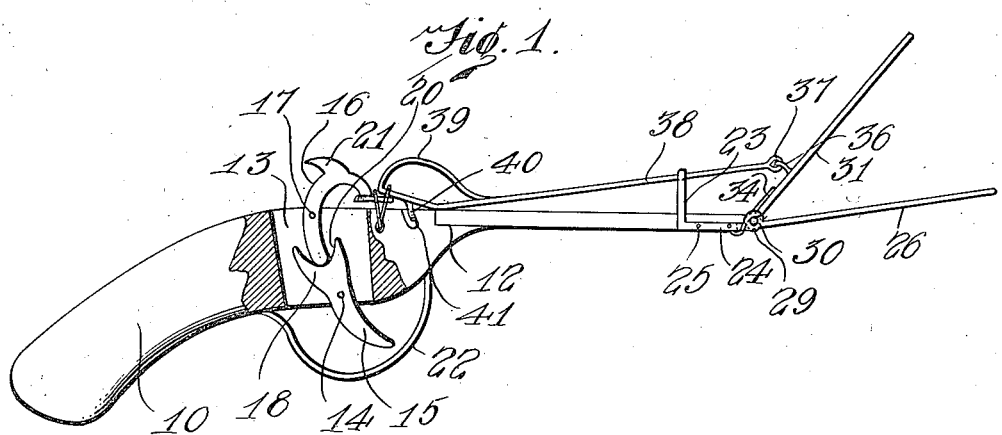
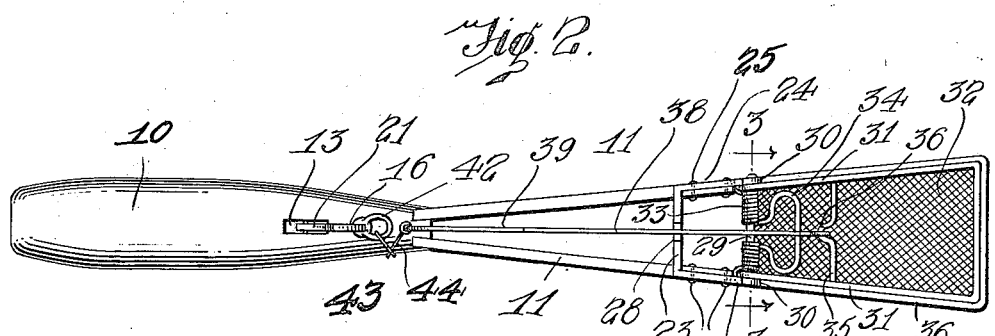
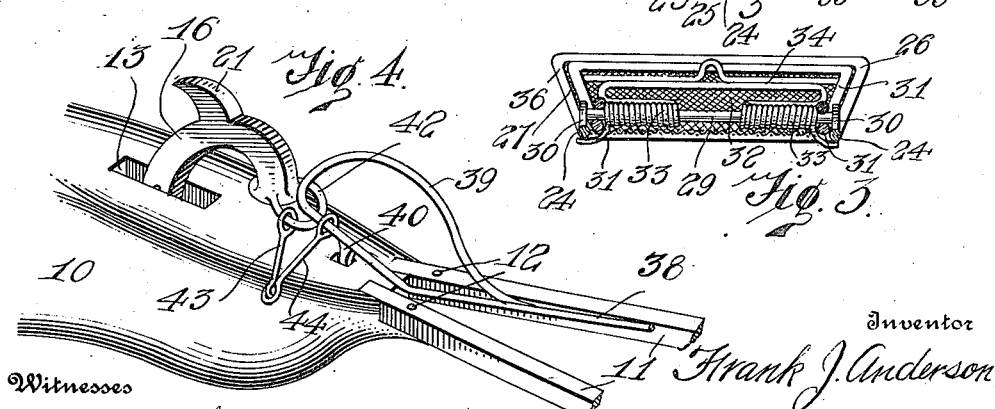
Inventor
Frank J. Anderson
By Richard B. Owen
Attorney
Witnesses
C. R. Hardy
J. R. Kelly

UNITED STATES PATENT OFFICE.

FRANK J. ANDERSON, OF BOX ELDER, MONTANA.

FLY-KILLING APPARATUS.

1,155,697.   Specification of Letters Patent.   Patented Oct. 5, 1915.

Application filed April 17, 1915. Serial No. 22,160.

*To all whom it may concern:*

Be it known that I, FRANK J. ANDERSON, a citizen of the United States, residing at Box Elder, in the county of Hill and State of Montana, have invented certain new and useful Improvements in Fly-Killing Apparatus, of which the following is a specification.

My invention relates to a mechanical fly killing apparatus.

The primary object is to provide an improved device of this character which is designed to be used for killing insects of different types, when they are on the fly and which can be further used as a swatter if it is so desired.

The device further includes striking mechanism the releasement of which may be caused at the desire of the operator, and which consists of opposite reticular bodies having reinforcing rim portions, one of the latter being formed slightly larger so that it may accommodate the other and allow the bodies to contact.

The elements of simplicity and durability have been thoroughly taken into consideration as will become apparent.

The above and other objects are accomplished by such means as are shown in their preferred form in the accompanying drawings, described in the following specification and then more specifically pointed out in the appended claims.

In the drawings wherein like characters designate like parts throughout the several views: Figure 1 is a side elevation of my invention showing parts thereof broken away. Fig. 2 is a vertical plan view. Fig. 3 is a horizontal sectional view taken on line 3—3 of Fig. 2. Fig. 4 is a perspective view showing the releasement mechanism.

In the drawings I have shown my invention used in conjunction with a pistol stock construction, yet it is apparent that the application of my device is not limited to this specific arrangement.

The stock or handle portion 10 is constructed of any suitable material and has arranged at the forward end thereof, diverging arms 11. As shown, the adjacent terminals of the arms are countersunk and secured to the handle as at 12 so as to obviate the lateral displacement thereof during the striking operation. A vertical cut-out portion 13 is arranged in the handle, wherein is pivotally positioned as shown at 14, a trigger 15. A hammer 16 is further positioned within the cut-out portion 13 adjacent the upper edges thereof and is normally held in pivotal relation to the handle through the medium of a pintle 17 for the purpose of accommodating the lower extremity of the hammer 10 and causing the rocking of the latter at the desire of the operator. The upper adjacent portion of the trigger 15 is enlarged as at 18 and cut-out as at 20 forming an arcuate engaging face. In order that the hammer may be drawn to certain positions relative to the handle for the purpose that will presently appear, an operating lip 21 is arranged thereon adjacent its uppermost portion, the lip extending therefrom at a suitable angle and having its upper face curved so that it may be readily engaged by the finger of the operator.

As is customary in connection with devices of this character, a guard 22 which is formed of suitable material, is arranged about the under face of the handle adjacent the lower terminal of the trigger in order to prevent the accidental releasement of the trigger. The specific form of guard shown is of an ordinary construction, and it is pointed out that different types of grips may be employed if it is so desired.

With view of supporting the striking mechanism, I have provided a bracket 23 which has extensions 24 rigidly secured to the adjacent terminals of the arms 11 as shown at 25. That portion of the extensions 24 beyond the terminals of the arms 11 is extended to form a continuous reinforcing rim portion 26 of the configuration shown and which supports a reticular body 27. The bracket 23 extends upwardly from the adjacent terminals of the extensions 24 and has a portion thereof curved to form a recess 28 for serving the purpose that will presently appear.

A transverse pin 29 is journaled through the opposite enlarged portions 30 of the extensions, and has movably arranged thereon a rim portion 31 supporting a second reticular body 32, and which is slightly smaller than the rim 26 in order that it may be snugly received therein and allow the bodies 27 and 32 to contact.

A spring member is provided which is coiled about the pin 29 as at 33 and which has its terminals secured to the extensions 24 in a suitable manner, the intermediate portion 34 normally exerting a pressure upon the body 32 so as to hold the same in engagement with the like portion 27.

In consistence with the foregoing, means are arranged in conjunction with the pivoted striking body and the hammer 16 so that the former may be held in a superposed position as shown in Fig. 1 and released at the desire of the operator. With this in view, a transverse element 35 is arranged in rigid relation to the respective opposite portions of the rim 31, and has an intermediate portion thereof curved as at 36 for connection with a similarly formed portion 37 formed upon one extremity of an actuating rod 38. The rod 38 extends within the recess 28 and during the operation thereof the walls of the recess serve as guide means therefor, to prevent lateral displacement.

Adjacent its rear end, the rod 38 is bent to form a hand grip 39 which has dependent therefrom a lug 40 which operates within the recess 41 for normally holding the rod in its rearmost position.

For the purpose of actuating the rod 38 so that the lug 40 will become disengaged from the recess 41, the hammer 16 has an outstanding protuberance 42 formed at the free extremity thereof and which normally engages the rear portion of the rod as is illustrated.

Upon reference to the drawings it will be readily apparent that the rocking of the hammer caused by the actuation of the trigger 15 will move the rear end of the rod 38 in a vertical plane consequently withdrawing the lug 40 from engagement with the recess 41 and effecting the releasement of the pivoted striking member.

For the purpose of limiting the later movement of the rear portion of the rod 38 so that the handle portion 39 thereof will at all times be in a position so that it can be readily manipulated, link members 43 and 44 are employed which have connection with the element 42 and the rod as shown.

From the foregoing disclosure it will be readily apparent that my invention can be primarily used as a mechanical striking means for killing insects and the like while the latter are on the fly, and yet which can be used as an ordinary fly swatter if it is so desired.

In reducing my invention to practice I find that the form referred to herein as the most practical and preferred embodiment is the most efficient, but realizing that certain conditions will necessarily vary in concurrence with the adoption of my device, I desire to emphasize the fact that various minor changes in the details of construction and proportion of parts may be resorted to when required without sacrificing any of the advantages of my invention as defined in the appended claims.

Having thus fully described my invention, what I claim as new and desire to secure by Letters Patent is:

1. In a device of the character described, an insect killing apparatus including a handle portion, a rim portion in rigid relation therewith, a reticular body carried by said rim portion, a second rim portion slightly smaller in length and width than said first mentioned rim portion in pivotal relation therewith, a reticular body carried by said second mentioned rim portion whereby when said reticular bodies are in a closed position they will engage each other, said second mentioned rim portion fitting within said first mentioned rim portion, and means for holding said second mentioned rim portion in a superposed position and means for releasing said second mentioned rim portion, substantially as described.

2. In a device of the character described, a handle portion, arms carried by said handle portion, a rim member rigid upon said arms, a body supported by said rim portion, a second mentioned rim portion in pivoted relation to said first mentioned rim portion, a body supported by said second mentioned rim portion, said first mentioned rim portion being larger to accommodate said second mentioned rim portion, yieldable means for holding second mentioned body in engagement with said first mentioned body, means for drawing said second mentioned body out of engagement with said first mentioned body and holding the same in a superposed position, a bracket arranged on said arms for guiding said last mentioned means, and means carried by said handle for releasing said last mentioned means and second mentioned body, substantially as described.

3. In a device of the character described, a handle portion, a body carried in rigid relation to said handle portion, a second body pivotally connected to said first mentioned body, a rod to draw said pivoted body to an elevated position, a lug depending from said rod, said handle provided with a recess to receive said lug, means to trip said rod to move said lug out of engagement with said recess and a spring to operate said pivoted body, as and for the purpose set forth and described.

4. In a device of the character described, a handle portion, a body in rigid relation to said handle portion, a second body pivotally connected to said first mentioned body, a rod having connection with said pivoted body, a handle portion formed about the rear end of said rod, a lug depending from said rod, said first mentioned handle portion provided with a recess for receiving said lug, means to trip said rod to move said lug out of engagement with said recess, a pair of links connecting said rod and said tripping means, and a spring for operating said pivoted body, substantially as described.

5. In a device of the character described, a handle portion, a body in rigid relation to said handle portion, a second body pivotally connected to said first mentioned body, a rod connected to said pivoted body, a handle portion formed at the rear end of said rod to facilitate manipulation thereof, a lug depending from said rod, said handle provided with a recess for the reception of said lug, a spring to actuate said pivoted body, a trigger mounted on said first mentioned handle portion, a hammer pivotally connected to said first mentioned body portion and arranged above said trigger, an offset portion on said hammer engaging said second mentioned handle portion, whereby when said trigger is rocked said hammer will move said rod to disengage said lug from said recess, and a pair of links connecting said hammer and said second mentioned handle portion, as and for the purpose set forth and described.

In testimony whereof I affix my signature in presence of two witnesses.

FRANK J. ANDERSON.

Witnesses:
J. I. WATSON,
M. F. RILEY.